United States Patent [19]
Giamati

[11] Patent Number: 5,552,576
[45] Date of Patent: *Sep. 3, 1996

[54] MODULAR DRAINMAST FOR AIRCRAFT

[75] Inventor: Michael J. Giamati, Akron, Ohio

[73] Assignee: The BF Goodrich Company, Akron, Ohio

[*] Notice: The term of this patent shall not extend beyond the expiration date of Pat. No. 5,290.996.

[21] Appl. No.: 157,866

[22] Filed: Nov. 24, 1993

Related U.S. Application Data

[63] Continuation-in-part of Ser. No. 839,866, Feb. 21, 1992, Pat. No. 5,290,996.

[51] Int. Cl.⁶ .............................. H05B 1/00; B64D 1/00; B64C 1/00
[52] U.S. Cl. ................ 219/201; 244/136; 244/129.1; 392/478
[58] Field of Search .................... 219/201, 200; 392/468, 472, 478, 480; 244/136, 129.1, 134 D; 60/39.094; 73/861.68

[56] References Cited

U.S. PATENT DOCUMENTS

| | | | |
|---|---|---|---|
| 1,784,157 | 12/1930 | Oglesby et al. | 244/136 |
| 2,325,018 | 7/1943 | Moss | 73/861.68 |
| 2,408,774 | 10/1946 | Goddard et al. | 244/136 |
| 2,428,585 | 10/1947 | Rogers | 73/861.68 |
| 2,510,986 | 6/1950 | Larkin | 73/861.68 |
| 2,984,107 | 5/1961 | Strieby | 73/182 |
| 3,125,880 | 3/1964 | Oliveau | 73/212 |
| 3,163,040 | 12/1964 | Werner | 73/861.68 |
| 3,378,673 | 4/1968 | Hopper | 392/480 |
| 3,400,583 | 9/1968 | Newport et al. | 73/861.68 |
| 3,484,062 | 12/1969 | Johnson | 244/136 |
| 4,038,519 | 7/1977 | Foucras | 219/505 |
| 4,275,603 | 6/1981 | Kalocsay | 219/201 |
| 4,364,517 | 12/1982 | Etheridge et al. | 244/136 |
| 4,458,137 | 7/1984 | Kirkpatrick | 219/201 |
| 5,046,360 | 9/1991 | Hedberg | 73/182 |
| 5,104,069 | 4/1992 | Reising | 244/136 |
| 5,290,996 | 3/1994 | Giamati et al. | 219/201 |

FOREIGN PATENT DOCUMENTS 556765 8/1993 European Pat. Off. ........ B64D 11/02

Primary Examiner—John A. Jeffery
Attorney, Agent, or Firm—Kevin L. Leffel

[57] ABSTRACT

A modular drainmast assembly for an aircraft includes a drain tube assembly removably enclosed in a fairing that is removably attachable to an aircraft. The electrically heated drain tube assembly may be accessed in the field for service, repair or replacement. A resilient sealed interface supports the drain tube where it exits the drainmast while permitting relative movement between the drain tube and the drainmast fairing due to thermal expansion and contraction.

36 Claims, 11 Drawing Sheets

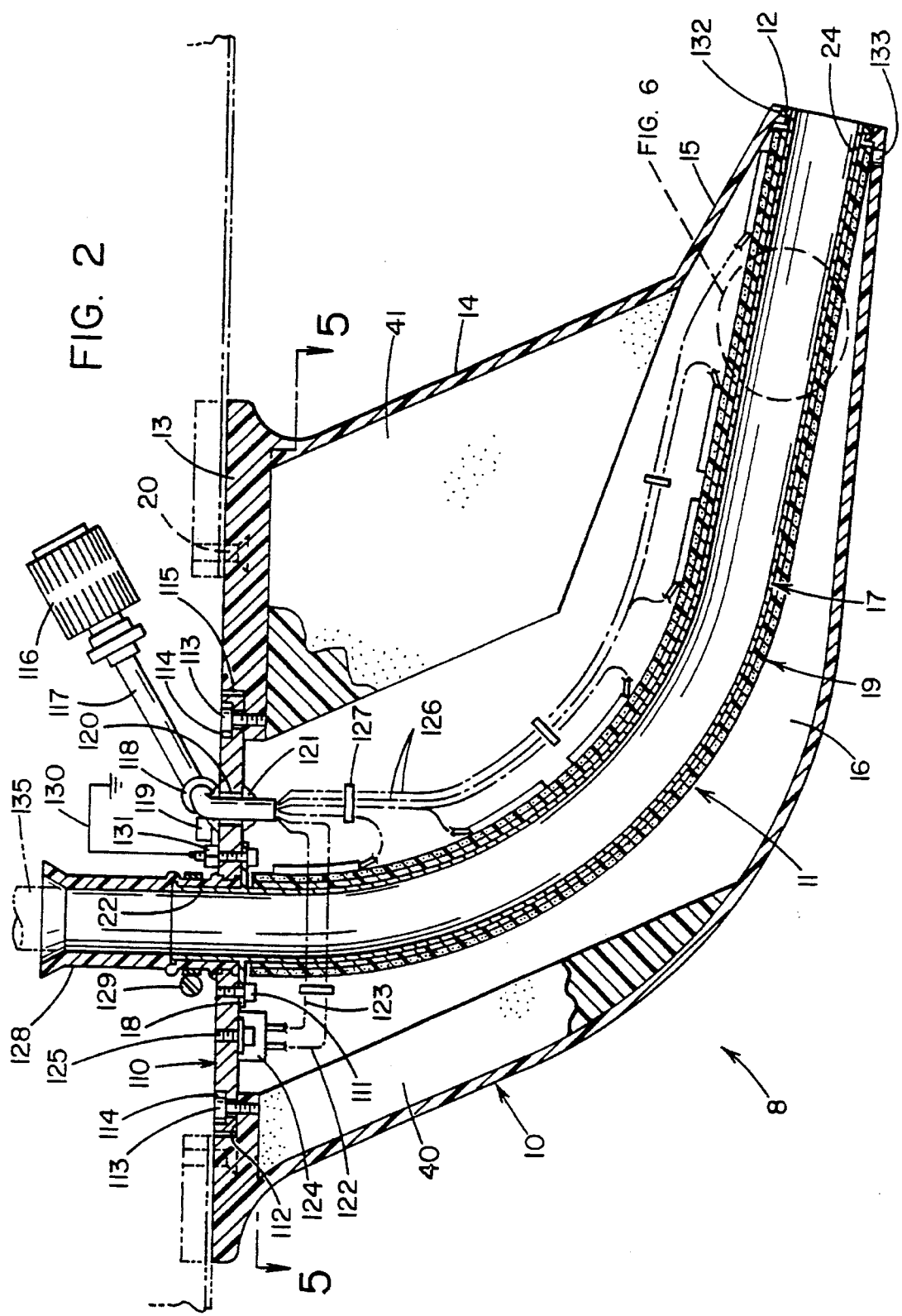

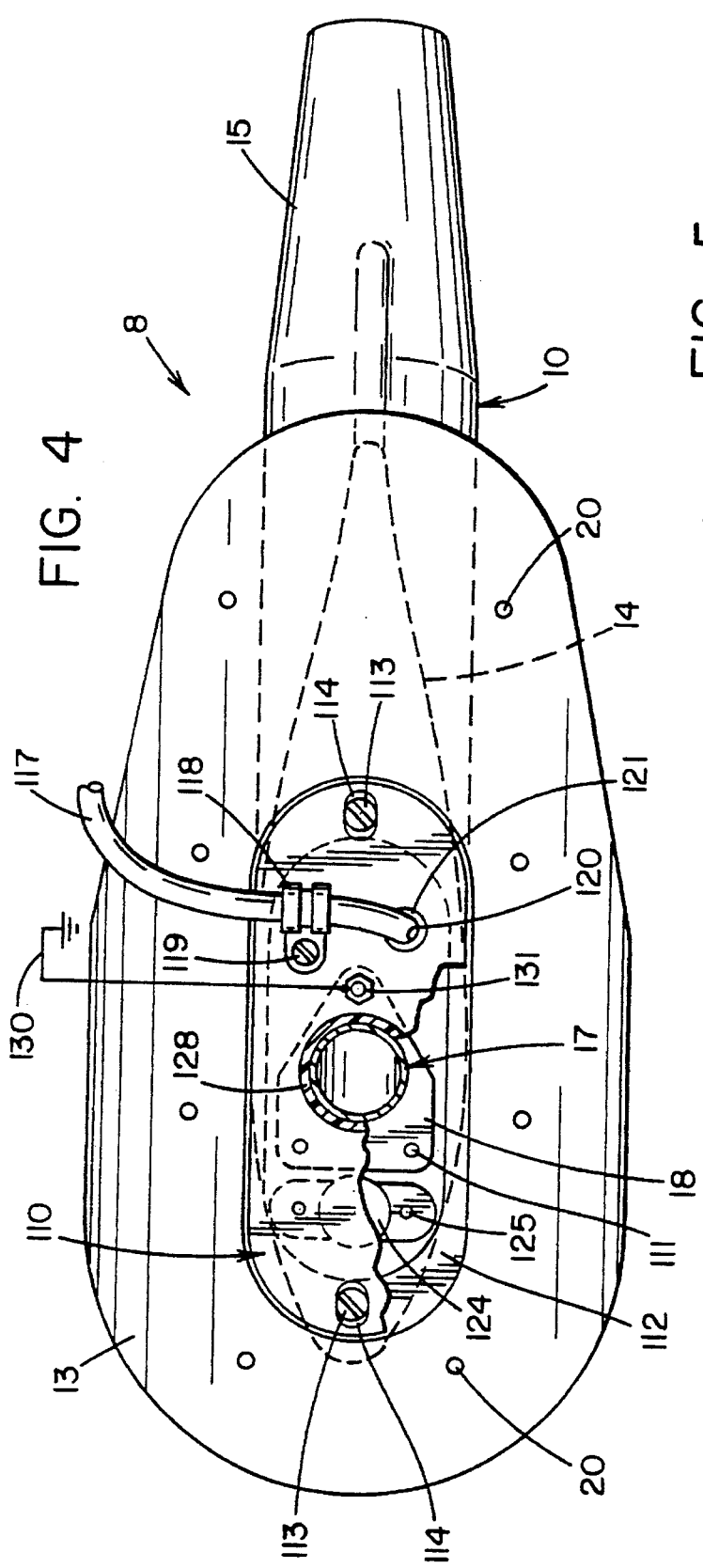
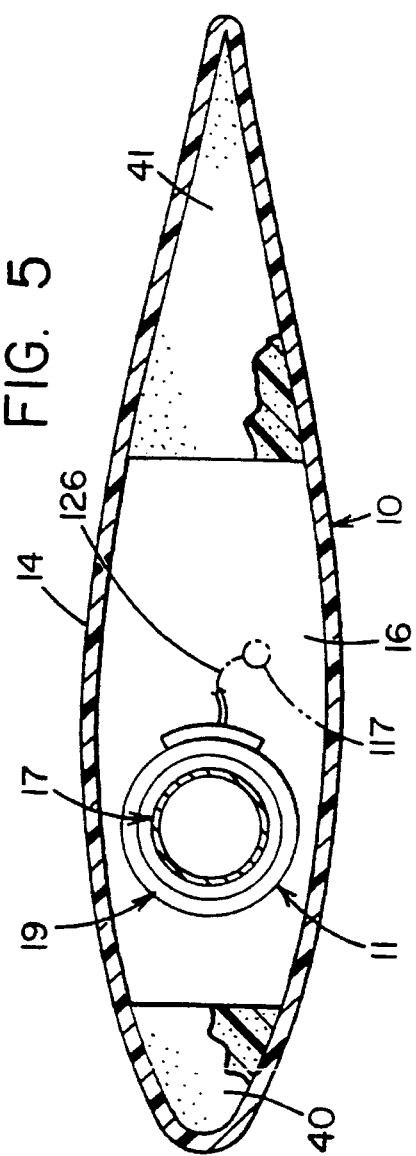

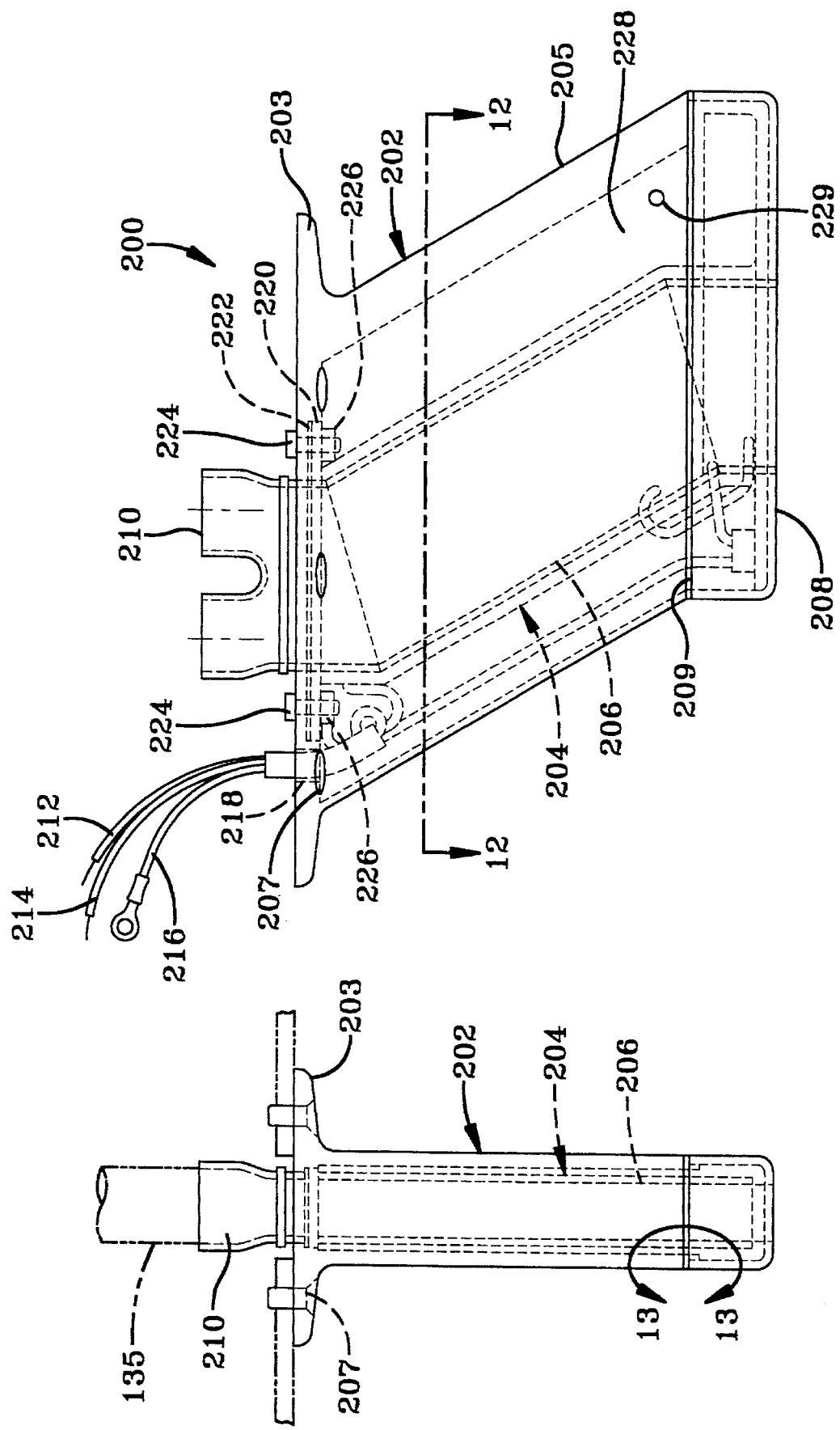

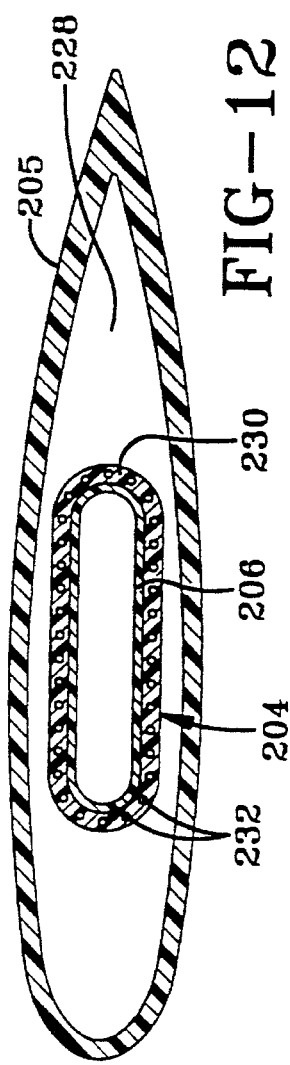
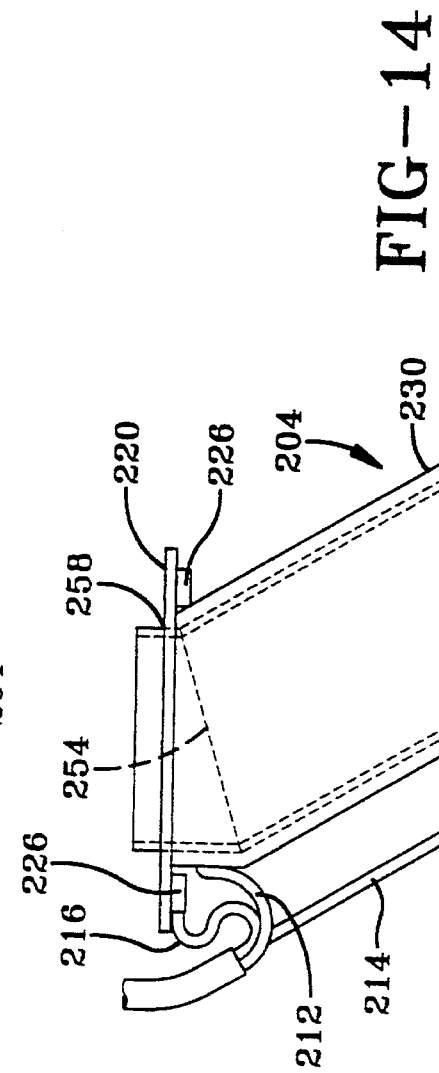
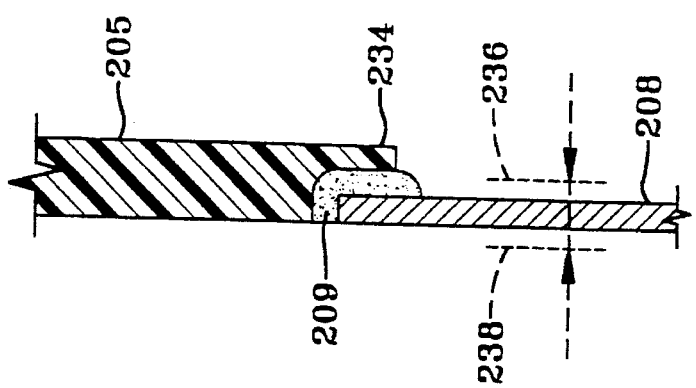

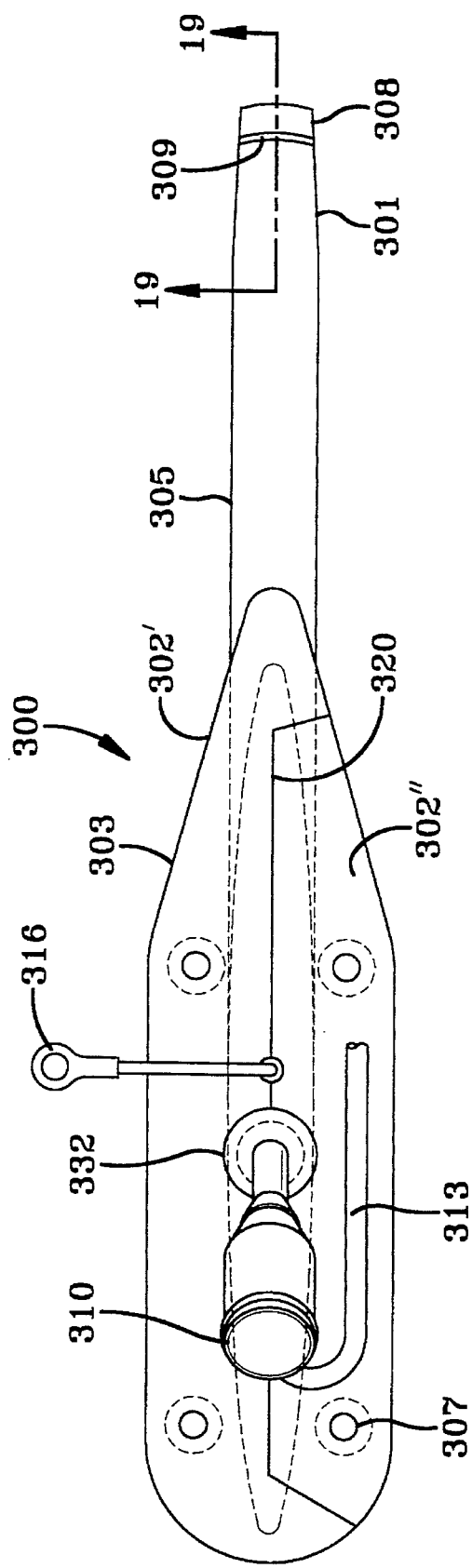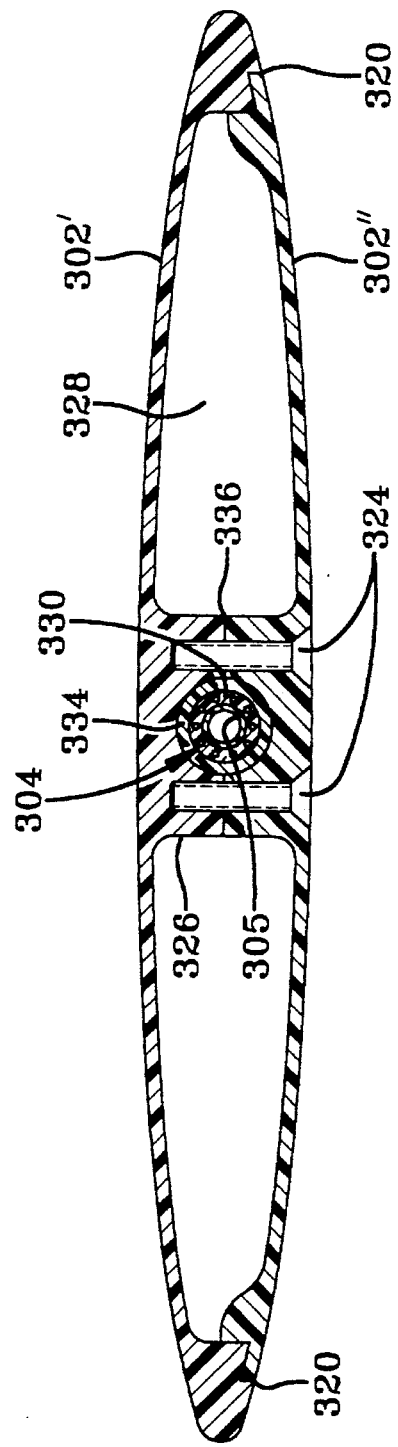
FIG-16
FIG-17

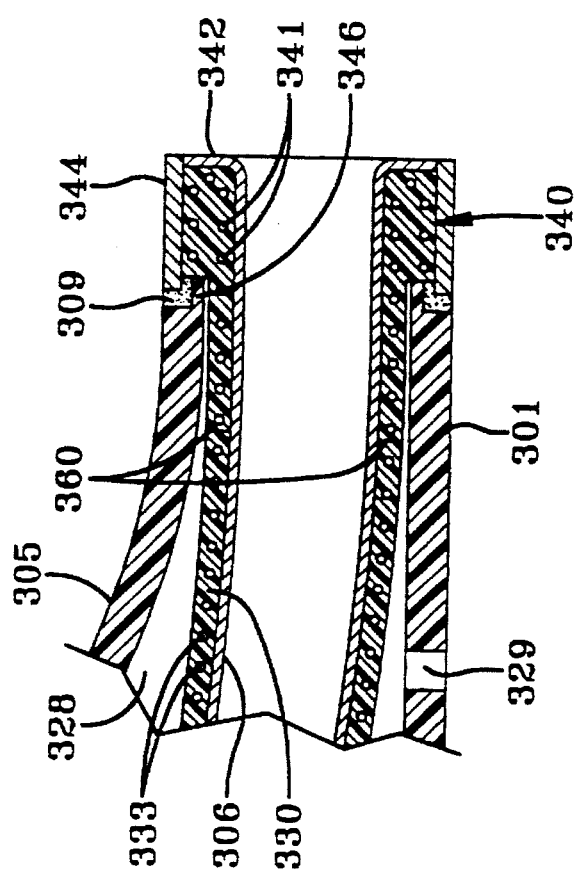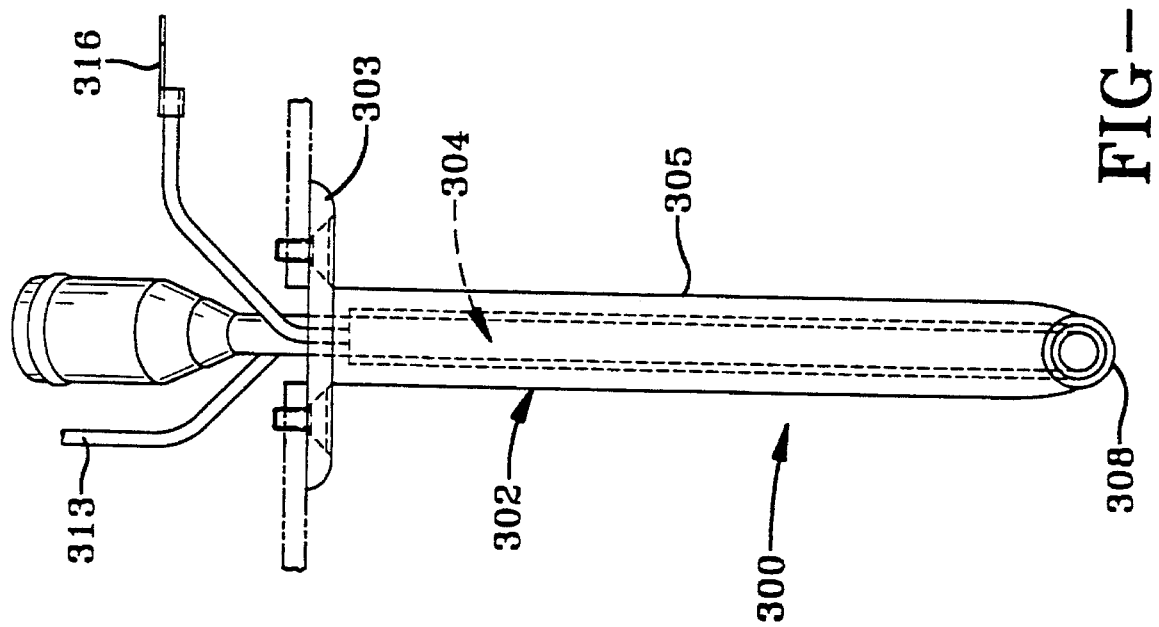

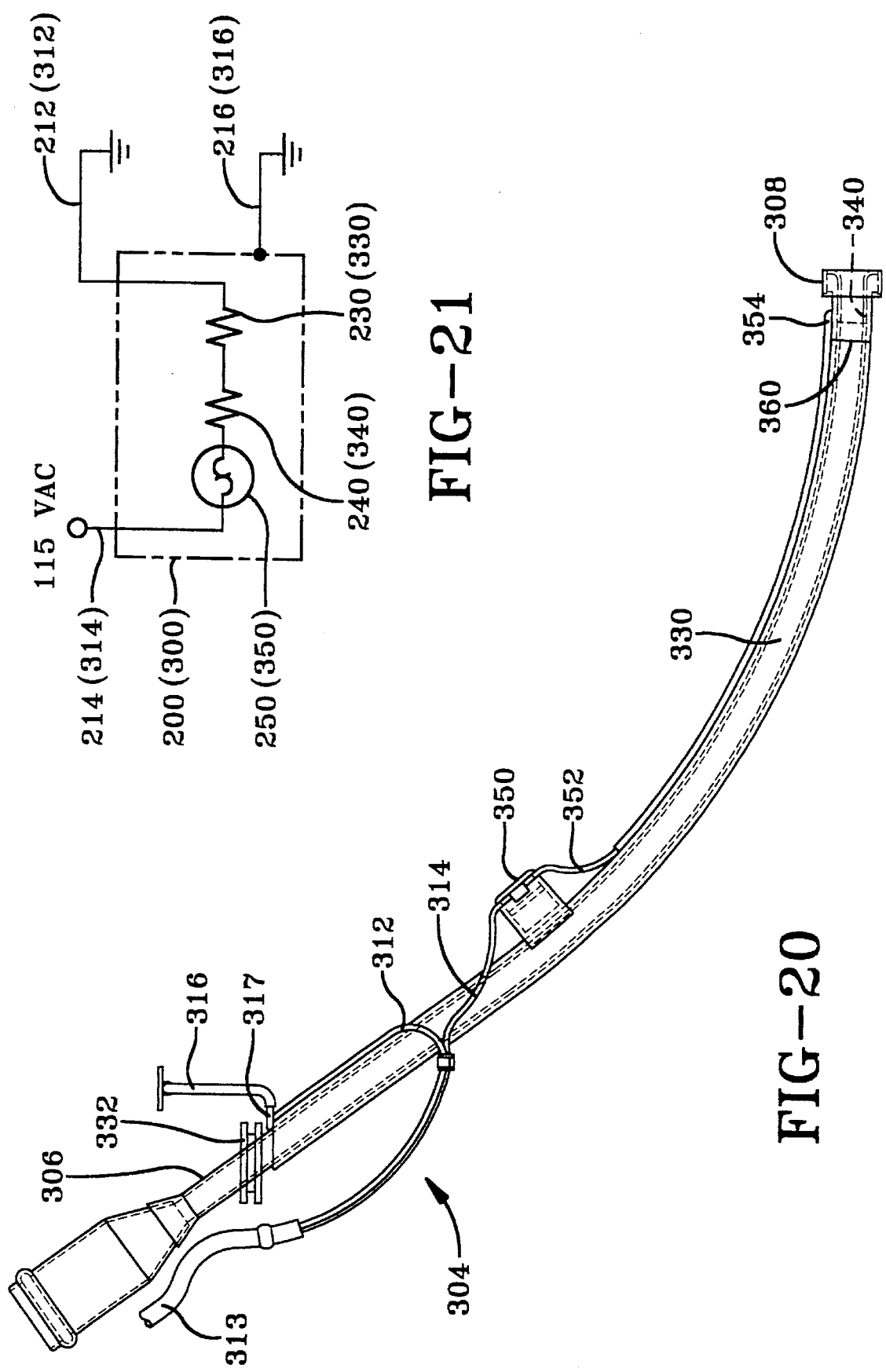

MODULAR DRAINMAST FOR AIRCRAFT

This is a continuation-in-part of application Ser. No. 07/839,866, filed Feb. 21, 1992, now U.S. Pat. No. 5,290,996 entitled Modular Drainmast for Aircraft.

BACKGROUND OF THE INVENTION

This invention pertains to a drain apparatus, particularly a drainmast for aircraft, and particularly to a modular drainmast including a drain tube removably enclosed in a fairing that is removably attachable to an aircraft.

A drainmast is used to eject waste water from an aircraft waste system during flight without impingement of the ejected fluid further aft on the body of the aircraft, and to drain the waste system when on the ground.

As used herein the term "waste water" means undesired water-based liquids that accumulate during operation of an aircraft on the ground and in flight. Waste water is generated by many sources, one common source being the aircraft galley in which water, soft drinks, coffee, wine, orange juice and other potable liquids are collected. Waste water can also accumulate from engine and other air inlets that trap water from condensation or ingest rain.

A drainmast generally comprises a drain tube enclosed within an aerodynamically shaped, drag minimizing fairing that when installed protrudes downwardly from the underside of an aircraft such that its outlet extends into the surrounding airflow stream during flight. It may be swept aftwardly of the aircraft with the direction of airflow. The drain tube is coupled to the aircraft waste water storage tank and is heated to avoid freezing. In certain applications waste water is accumulated until it reaches a certain volume. Thereupon a valve inside the aircraft opens and the waste water drains from the tank through the drainmast. In other applications, the waste water is continuously drained.

There are two prevalent configurations for drainmasts. One is herein referred to as a bottom discharge mast. The other configuration is herein referred to as a rear discharge mast.

In a bottom discharge drainmast, the waste water is ejected generally perpendicularly to surrounding airflow. The mast is generally straight and swept. The axis of the drain tube at the exit forms an acute angle with the axis at the entrance. The angle is usually close to the angle of sweep of the mast.

In a rear discharge drainmast, the mast is swept and wing shaped and tapers into an exit tube at the tip that is roughly parallel to surrounding airflow. Water is ejected parallel to the surrounding airflow from the rear of the mast. Since the axis of the drain tube at the exit is nearly perpendicular to the axis at the entrance, the drain tube is either bent in a smooth curve or is fabricated from two or more straight sections that together form the appropriate angle.

The rear discharge mast is believed to be preferable to the bottom discharge mast. A portion of the water ejected from a bottom discharge mast has a tendency to adhere to the tip of the mast and dribble back driven by surrounding airflow. Much of it can freeze to the mast before it is blown away. In contrast, a properly designed rear discharge mast generates a suction action as surrounding airflow passes around the exit tube. Ejected water is sucked out of the tube into surrounding airflow. Very little if any water adheres to the mast.

Drainmasts have been used on aircraft for many years. A common design developed for early commercial jet aircraft and still in use today is a rear discharge configuration and includes a fairing consisting of two shaped aluminum halves that are fastened together with screws. Each fairing half has a channel that receives the drain tube. The drain tube is formed from stainless steel or copper. Silicone elastomer tape is wrapped around the tube in several locations. The tape compresses when the halves are screwed together and firmly locates the tube in the mast. Because clearance between the tube and the mast is very small, considerable heat loss to and through the fairing occurs. The drain tube is either bent or fabricated from multiple sections. The drain tube cross section is oddly shaped ranging from oblong to triangular. Some designs have a cross section that changes between the inlet and the outlet. This design is suspected of being more susceptible to clogging than drain tubes of constant cross section. The drain tube is locally heated by fixed resistance ceramic type resistors. Heating along the length of the drain tube is provided only by heat conduction along the tube. A heated portion of the drain tube extends out of the drainmast at the tube exit to prevent freezing of residual water. Sustained temperature of the drain tube can reach 700° F. The exterior of the drainmast can reach temperatures on the ground which present a hazard to service personnel. Some designs are open at the top where the drainmast mates with the aircraft. This can present a fire hazard if hydraulic fluid or lubricating oils leak into the drainmast and contact the heating elements.

Another known drainmast design is of bottom discharge configuration and has a fairing that is formed from two pieces of compression molded fiber reinforced plastic. The two halves are fastened together with adhesive and screws. The drain tube is copper, has a constant round cross section, and is attached to a shaped metal tip that covers the end of the mast. The heating element is wire or foil encapsulated in silicone rubber. The heating element is bonded to the outside of the tube and inside the metal foot that covers the end of the drainmast. The heated metal foot is required to prevent discharged waste water residue from freezing to the drainmast. As discussed previously, this is an inherent problem with bottom discharge drainmasts. The drain tube is sandwiched between the fairing halves which are mated to the metal foot. The entire assembly is filled with expanding foam. The resulting unit is integral and cannot be disassembled without damaging the components. The top of the unit is sealed where it mates with the aircraft. A controller inside the aircraft cycles power to the heating element to maintain temperature within preset limits. Power is transferred to the drainmast via a connector that is attached to the mounting base of the mast.

A more recent known drainmast design also utilizes a fiber reinforced plastic fairing. Mirror image fairing halves are formed from resin impregnated fabric that is laid into a female mold, vacuum bagged, and cured under heat and pressure, and trimmed after molding. The drain tube is formed from fiber reinforced plastic and has an integral heating element encapsulated in fiber reinforced plastic and bonded to the outside of the tube. The fairing halves are bonded together with the drain tube sandwiched in between. Lightweight filler material such as polyurethane expanding foam occupies the void in between the tube and fairing. The resulting drainmast is integral and cannot be disassembled without damage or destruction of the drainmast assembly. A heated foot is not required because the rear discharge feature is utilized.

The heating element for this drainmast design is a pattern of wire that has a high positive coefficient of electrical resistivity. As the element heats the resistance increases which causes supply current to decrease. A steady power consumption and drain tube temperature is reached the values of which depend on the operating environment of the drainmast. This feature is referred to as a self regulating heating element. An electrical controller inside the aircraft is not required which greatly simplifies the system. A thermoswitch may be located inside the drainmast. The thermoswitch is operably connected to cause opening of the power supply circuit when the thermoswitch temperature is above a preset value to prevent current from flowing to the heating element when outside air temperature is above freezing. This feature is desirable to prevent overheating the fiber reinforced plastic fairing. It also serves to decrease overall power consumption of the drainmast. All electrical components are encapsulated inside the drainmast and cannot be removed.

Yet another recent known drainmast design has a fairing consisting of fiber reinforced plastic that is resin transfer molded in one piece. As in other known embodiments the drain tube and thermoswitch are integrally molded in place inside the fairing during the resin transfer molding process and cannot be removed without damage or destruction.

SUMMARY OF THE INVENTION

According to the invention, a drainmast is provided for discharging fluid into a surrounding airflow, comprising: a fairing having first and second opposing ends; a drain tube disposed within said fairing and exiting said fairing at said first and second ends, said drain tube including an electrothermal heating element; a drain tube attachment that attaches said drain tube to said fairing; and, a first resilient sealed interface between said drain tube and said first end.

According to another aspect of the invention, a drain tube apparatus is provided for an aircraft drainmast assembly of the type having a fairing with first and second opposing ends, a drain tube disposed within the fairing and exiting the fairing at the first and second ends, a drain tube attachment that attaches the drain tube to the fairing and, a first resilient sealed interface between the drain tube and the first end, said drain tube apparatus comprising: a drain tube adapted to be disposed within and attached to the fairing with the drain tube exiting the first and second ends with a resilient sealed interface between the drain tube and the first end, said drain tube including an electrothermal heating element.

According to still another aspect of the invention, a method is provided of assembling a drainmast comprising the steps of: providing a fairing having first and second ends; disposing a drain tube including an electrothermal heating element within said fairing with said drain tube exiting said first and second ends; attaching said drain tube to said fairing; and, forming a resilient and sealed interface between said drain tube and said first end.

BRIEF DESCRIPTION OF THE DRAWINGS

FIG. 2 is an enlarged side view in section of the drainmast assembly of FIG. 1.

FIG. 4 is a plan view of FIG. 2 with parts broken away.

FIG. 5 is a plan section taken on line 5—5 of FIG. 2.

FIG. 10 is a side view of a drainmast assembly according to a second embodiment of the invention.

FIG. 11 is a left end elevation of FIG. 10.

FIG. 12 is an enlarged cross section taken on line 12—12 of FIG. 10.

FIG. 13 is a cross section of the interface between the foot and the fairing in the area specified by line 13—13 of FIG. 11.

FIG. 14 is a side view of the drain tube assembly of the FIG. 10 drainmast assembly with parts broken away.

FIG. 16 is a top elevation of FIG. 15.

FIG. 17 is an enlarged cross section taken on line 17—17 of FIG. 15.

FIG. 18 is a right end elevation of FIG. 15.

FIG. 19 is an enlarged fragmentary cross section taken along line 19—19 of FIG. 16.

FIG. 20 is a side view of the drain tube of the FIG. 15 drainmast assembly.

FIG. 21 is a schematic diagram of an electrical circuit for the FIG. 10 and 15 embodiments of the invention.

DETAILED DESCRIPTION OF THE INVENTION

Figure 1:
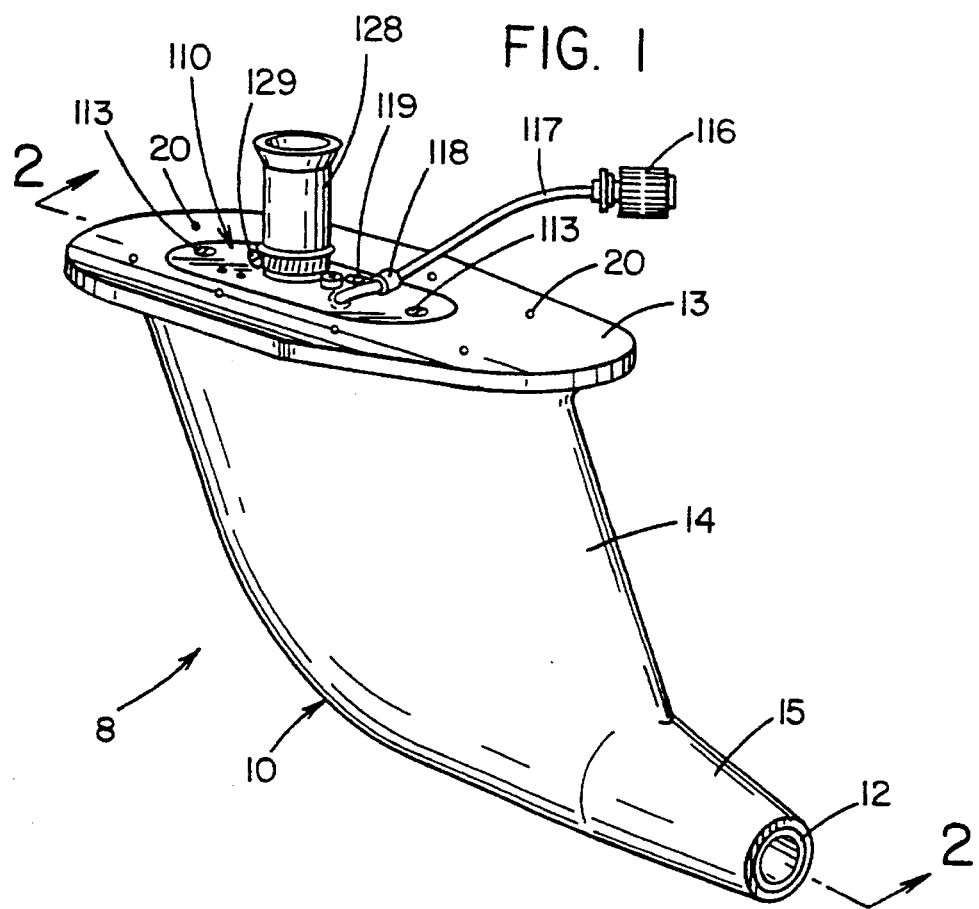
FIG. 1 is a pictorial view looking from the rear of a modular drain mast assembly according to the invention.

In the drawings, the rear of the drainmast is defined as that portion furthest downstream relative to surrounding airflow when the drainmast is installed on its intended airplane that is in flight. In the drawings like reference numerals designate like or corresponding parts throughout the several views.

In FIGS. 1 and 2 there is shown a drainmast assembly 8 which includes fairing 10, drain tube assembly 11, and an elastomeric fitting 12. The fairing 10 comprises a mounting base 13, a mast 14 and an exit tube 15. In certain preferred embodiments these components of fairing 10 form a single integral piece. The fairing 10 includes a cavity or fairing hollow 16. As is best seen in FIG. 5, the fairing 10 is provided with leading edge foam core 40 and trailing edge foam core 41 for increased strength and rigidity. As shown in FIGS. 1 through 4, a plurality of mounting holes 20 are provided in the mounting base 13 for attaching the drainmast assembly 8 to the aircraft.

While the invention is described with regard to a one piece fairing 10, a multi-piece fairing may be used with the drain tube assembly 11 of the invention. However, a one piece fairing is much stronger because there is no seam line where mechanical failure can initiate. Of the known methods that may be used to form a one piece fairing, it is believed that resin transfer molding is the least expensive and provides the strongest part. In certain preferred embodiments a foam core is molded within the fairing and thereafter partially removed by mechanical means thereby forming the hollow 16. The ply lay-up of dry glass or other reinforcing fiber within the resin transfer mold, the determination of an optimum resin, and the actual molding process can be determined by a practitioner skilled in the art of resin transfer molding in known manner. High strength can be obtained by wrapping two-directional weave reinforcing cloth around the foam core thereby creating an array of continuous fibers around and along the drainmast. Additional fiber is provided in the corners of the mounting base to inhibit the formation of resin rich areas that are likely to chip. In certain preferred embodiments, room temperature curing polyester resin is used and the final fiber loading of the fairing is 30 to 40 percent.

Figure 3:
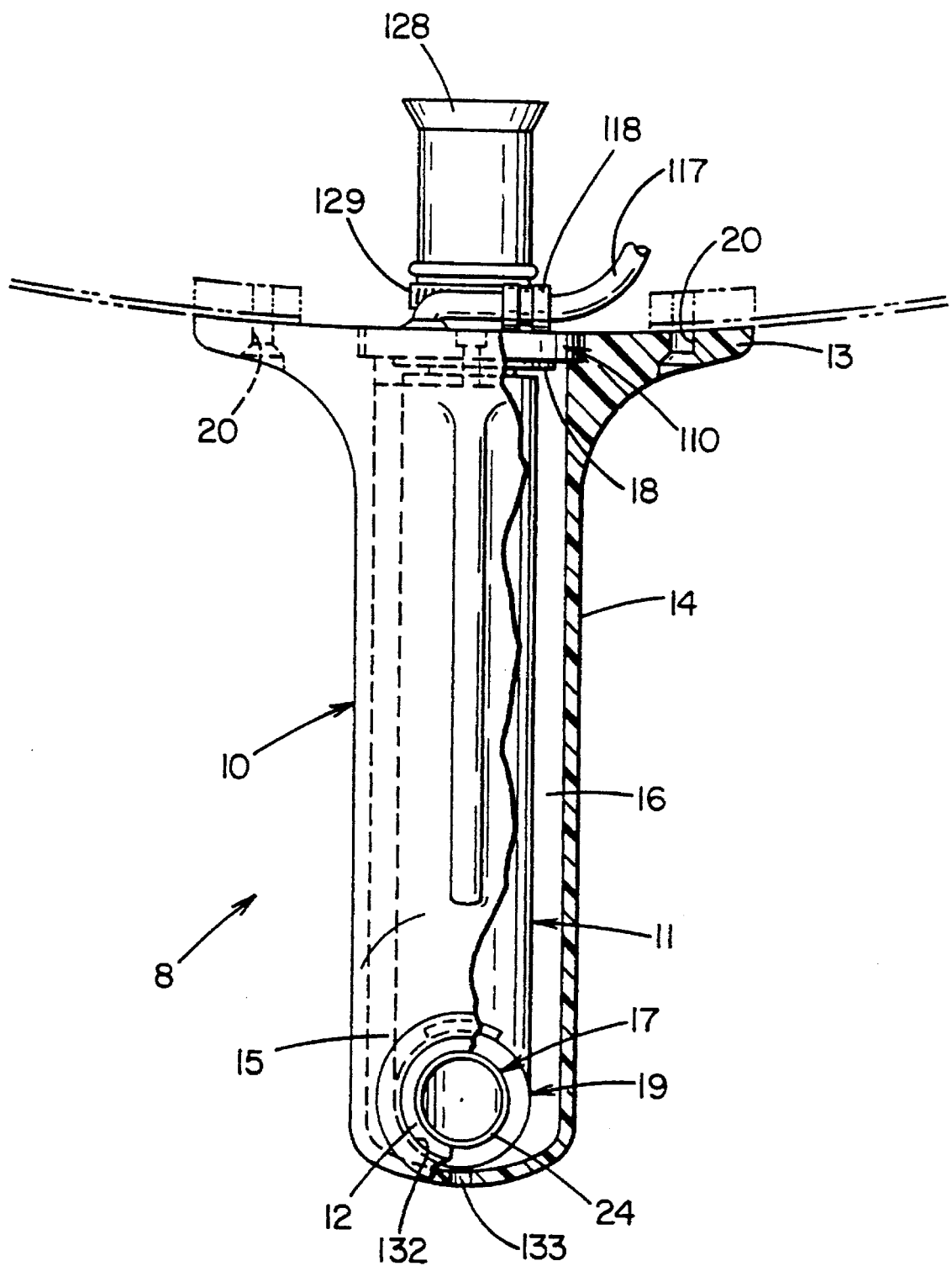
FIG. 3 is a right end elevation of FIG. 2 with parts broken away.

The drain tube assembly 11 comprises a drain tube 17, an electrothermal heater 19, and a drain tube flange 18. The drain tube 17 is rigidly attached to a drain tube flange 18 which is attached to an access plate 110 by screws 111. Though the illustrated embodiment uses three flange screws 111, this number is arbitrary and can be as few as one. The access plate 110 seats into a shoulder recess 112 in the mounting base 13. The recess 112 is complementary in shape and size to access plate 110 such that the top of the access plate 110 is flush with the top surface of the mounting base 13 when installed. The access plate 110 is held in place by access plate screws 113. The access plate 110 has slots 114 for receipt of access plate screws 113. Slots 114 permit fore and aft adjustment of the drain tube assembly 11 relative to the fairing 10 and compensate for dimensional variations that occur in manufacturing. Sealant layer 115 prevents fluids and other contaminants from penetrating into the fairing hollow 16. The end of outlet portion 24 of the drain tube 17 is resiliently and slidably supported within the aperture of annular elastomeric seal fitting 12 mounted within a recess 132 at the end of the exit tube 15. This manner of mounting the drain tube 17 enables relative movement between the tube 17 and the fairing 10 due to thermal expansion and contraction, seals the fairing 10 against entry of fluid exiting the tube, and facilitates removal and reinstallation of the tube for service or replacement. The annular elastomeric fitting 12 also serves to thermally isolate the drain tube 17 from the exit tube 15. FIGS. 2 and 3 present additional views of the annular elastomeric fitting 12 in relation to the fairing exit tube 15 and drain tube 17.

In certain preferred embodiments, the drain tube 17 is resiliently attached to the access plate 110 enabling additional movement for compensation of misalignment among the access plate 110, the mounting base 13, the exit portion 24 of the drain tube 17 and the annular elastomeric fitting 12. This feature may reduce manufacturing cost by allowing greater dimensional tolerances.

In certain preferred embodiments, the annular elastomeric seal fitting is formed from silicone elastomer. Other elastomeric materials can be used that have suitable mechanical and chemical properties.

As described hereinbefore, in certain known constructions a drain tube assembly (not illustrated) is molded into a fairing (not illustrated) as a part of the process of resin transfer molding of the fairing. Cyclic loading from thermal expansion and contraction of the drain tube during heating and cooling is transferred directly to the fairing and cracking of the fairing has been known to occur. The present invention solves this problem by allowing at least one end of the drain tube to move relative to the fairing, freely expanding and contracting without resistance. This feature is not restricted to a modular construction and could be applied equally as well if the drain tube were permanently attached to the fairing, for example by bonding the attachment plate to the mounting base of the fairing.

Figure 6:
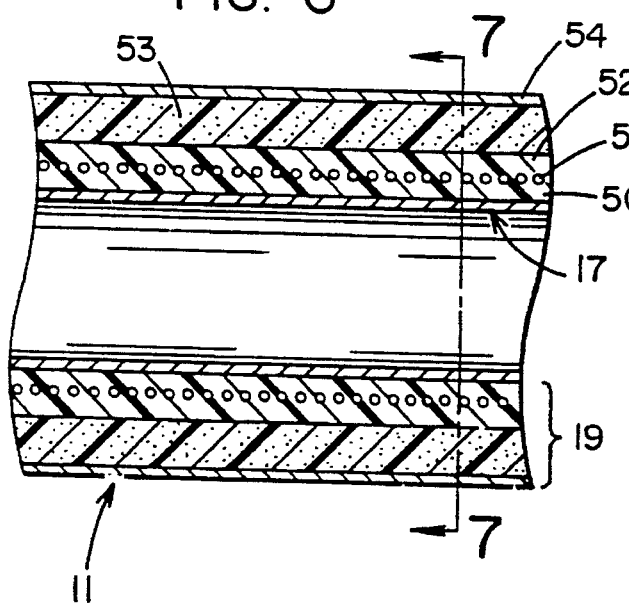
FIG. 6 is a further enlarged fragmentary sectional view of a portion of the drain tube assembly.
Figure 7:
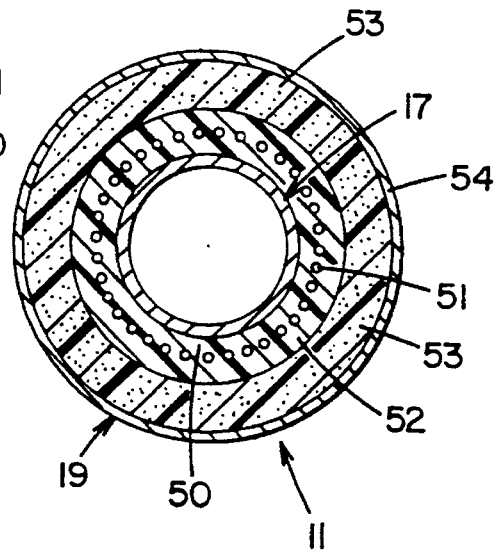
FIG. 7 is a cross section taken on line 7—7 of FIG. 6.

As shown in FIGS. 6 and 7, the electrical heater 19 comprises heater wire 51 encapsulated in electrical insulating material 50 and 52, a layer of thermal insulation 53, and a radiant heat barrier 54 which in the embodiment shown is metallic foil. The electrical heater 19 is wrapped around and is bonded to the outside of the drain tube 17.

In certain preferred embodiments, the drain tube is formed from stainless steel, the insulating layers 50 and 52 are Permacell FS903 fiberglass supported silicone elastomer (thermoset) plies 0.023 inch thick, the thermal insulation 54 is Bisco Products Exobloc RF-100 foamed silicone elastomer with an integral outermost layer of aluminum foil that acts as the radiant heat barrier 54, and the heater wire composition is 70% nickel and 30% iron.

A wire composition of 70% nickel and 30% iron results in a self-regulating heater when properly designed. The design process iterates between design and experiment. The required power density in watts per unit area for the heater tube surface is analytically estimated based on a set of baseline operating conditions for the intended aircraft application. The pertinent operating parameters are the construction of the tube and fairing, flow rate and temperature of waste water through the tube, and outside conditions such as freestream velocity and temperature. A wire gauge providing a desired lineal resistivity in ohms per foot is chosen based on the desired power density and the wire spacing. As conditions change from the baseline condition, the element temperature tends to rise or fall depending on the condition and element resistance tends to rise and fall with the temperature. These changes in resistance cause corresponding inverse changes in power generation. For any given condition, the element will seek a steady state temperature. For silicone elastomer of a preferred embodiment, the highest acceptable steady state temperature is about 450° F. For certain fiber reinforced plastics the highest acceptable steady state temperature is about 300° F. A heater wire composition of 70% nickel and 30% iron provides enough change in resistance versus temperature that heaters can be designed to operate at or below these maximum steady state temperatures within acceptable limits of wire gauge and spacing.

The heating element may be manufactured as follows. A ply of fiberglass coated with uncured silicone elastomer is wrapped lengthwise around a stripper plate and placed on a winding jig that comprises two spaced rows of pins projecting from a plate. The heater wire is wound onto to the winding jig over the silicone ply. The stripper plate is removed with the silicone ply and wire pattern. The silicone ply and wire pattern are removed from the stripper plate and rolled flat. Another silicone ply is placed over the heater wire. A template is located over the uncured heater element assembly and the heater element assembly is trimmed to final shape. The flat pattern of the uncured element assembly should be such that it can be applied without wrinkling to a curved tube while being wrapped around the circumference of that tube. A stepped plug (not illustrated) is installed into the exit end of the drain tube to prevent the silicone elastomer from flowing all the way to the end of the tube thereby providing a stepped back shoulder. The end of the drain tube is thus not coated with silicone elastomer and is freely insertable into the aperture of elastomeric seal fitting 12. The drain tube is degreased and the uncured heater element assembly is wrapped lengthwise around the tube. Leadwires are silver soldered to the heater wires. A strip of nonadherent release fabric is spiral wrapped around the tube covering the surface of the uncured heating element. The uncured assembly is vacuum bagged and cured under heat and pressure in an autoclave. It is believed that oven curing may be used.

Another ply of fiberglass coated with uncured silicone elastomer material is applied to the outside of the cured heater element and a layer of thermal insulation is wrapped lengthwise around the heater element and drain tube. The assembly is spiral wrapped with nonadherent release fabric, vacuum bagged, and cured under heat and pressure in an autoclave. Finally, the part is post cured in an air circulating oven at 450° F. for three hours.

Many variations from the particular embodiment illustrated are possible. For example, in certain preferred embodiments the drain tube 17 can be formed from any suitable metal including copper or fiber reinforced plastic rather than stainless steel. The layer of thermal insulation 53 can be formed from a variety of commercially available insulating materials or eliminated altogether in certain applications. The same applies to the layer of radiant insulation 54.

In certain preferred embodiments, the electrical insulation layers 50 and 52 may be formed from any suitable heat resistant elastomeric material instead of silicone. A heat resistant elastomeric material is defined as an elastomeric material that retains suitable mechanical and electrical properties without degradation during sustained periods of drainmast operation. The electrical insulation layers could also be formed from heat resistant fiber reinforced plastic rather than elastomeric material.

As shown in FIGS. 2 and 5, the drain tube 17 and heater 19 pass through the fairing hollow 16 without touching the fairing walls. The dead air space within the fairing hollow thermally insulates and isolates the fairing from the heated drain tube assembly.

The power wires 126 are preferably arranged in a manner that avoids contact with the fairing walls. Their position is maintained by use of tie-wraps 127 as shown in FIG. 2. Contact of the power wires 126 or heater 19 with the fairing walls can cause wear and early failure.

In use, electrical current is supplied to the electrical heater 19 through a connector 116 and a cable 117. The cable 117 is attached to the access plate 110 by a cable clamp 118 and cable clamp screw 119 and passes through a cable hole 120 provided in the access plate 110. A cable seal 121 is provided where cable 117 passes through access plate 110 to prevent penetration of fluids and other contaminants into the fairing hollow 16. Two thermoswitch wires 122 and 123 exit the cable 117 and are connected to a thermoswitch 124. The thermoswitch 124 is mounted on the access plate 110 by screws 125. Power wires 126 are connected to the heater wires 51 of each of the three zones of the electrical heater 19. Cable tie-wraps 127 bundle the various wires 122, 123 and 126 at several locations. A ground strap 130 is attached to the access plate 110 by a ground strap screw 131.

In other embodiments, the electrical connector could be mounted directly to the top of the access plate or mounting base. However, in this location, the connector could be subjected to waste water leaking from the adapter fitting 128 or to other fluids leaking through the seal between the mounting base and the aircraft body (not illustrated). Corrosion of the connector from contact with these liquids has been known to occur. The illustrated embodiment avoids this problem by separating the connector from the mounting area on a cable.

Means must be provided to couple the drain tube 17 to the outlet nipple 135 of the aircraft waste water system. In the illustrated embodiment, a flexible adapter fitting 128 is attached to the drain tube by a hose clamp 129. Adapter fitting 128 is configured to sealingly engage the complementarily sized and configured aperture in the access plate 110. In certain preferred embodiments the adapter fitting 128 is compressed as screws 111 are tightened to draw the drain tube flange 18 into contact with the underside of the access plate 110. The manner of coupling the drain tube to the aircraft waste water system outlet may be varied from that specifically illustrated and described depending on the application.

Figure 9:
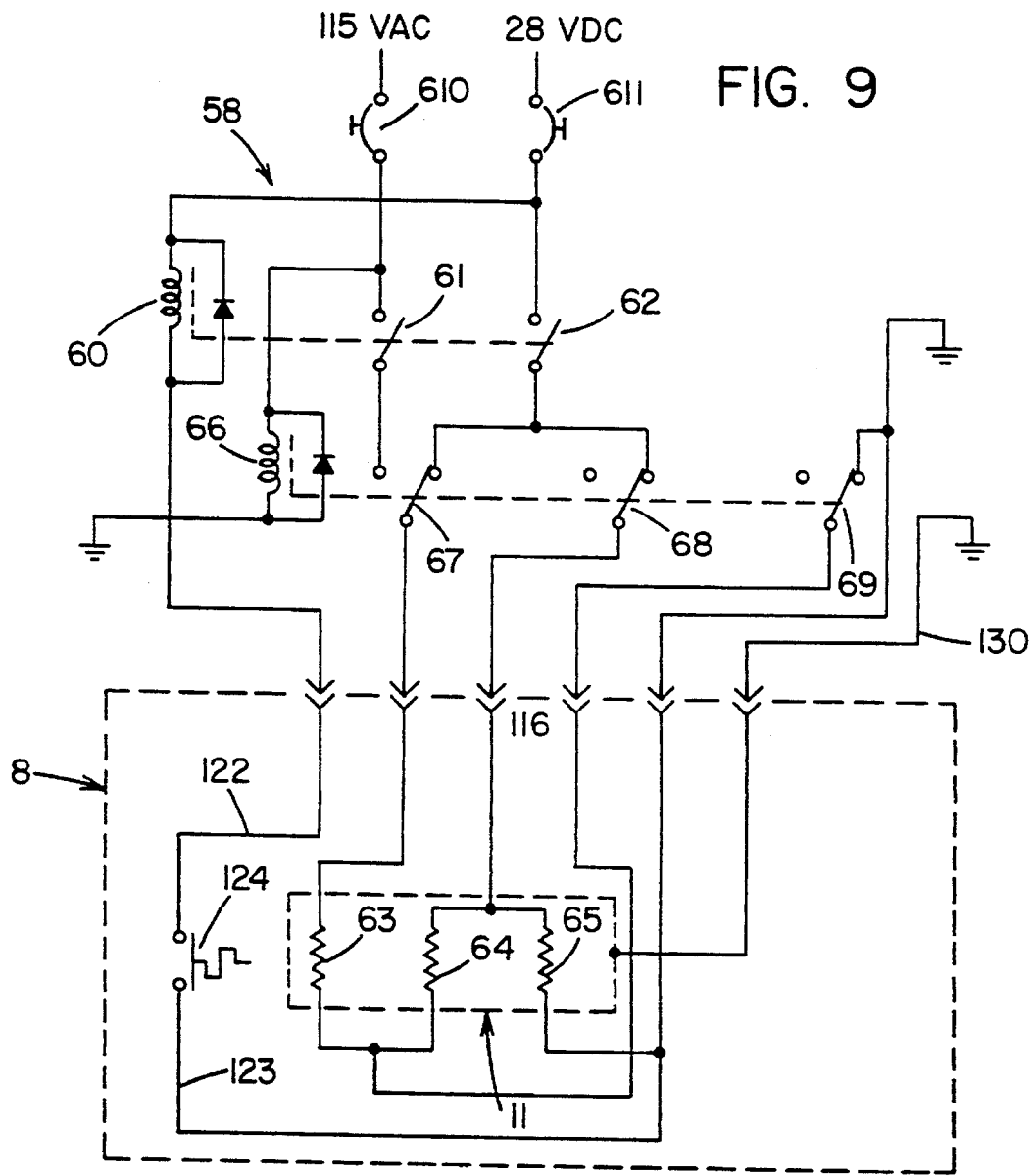
FIG. 9 is a schematic diagram of an electrical circuit for one embodiment of the invention.

A suitable circuit diagram for use with the invention is shown in FIG. 9. The circuit 58 operates on 115 VAC while the aircraft is airborne and on 28 VDC while the aircraft is on the ground. The thermoswitch 124 opens the ground line 122 and 123 for the thermoswitch relay 60 when the thermoswitch temperature is above a preset value. The thermoswitch relay 60 thereupon opens relay contacts 61 and 62. When the aircraft is on the ground, and the thermoswitch 124 is closed, 28 VDC power is applied to the drain tube heater resistances 63, 64, and 65 through power control relay 66 contacts 67 and 68. Relay contact 69 provides an additional ground connection. In this 28 VDC configuration the heater resistances 63, 64, and 65 are connected in parallel to the 28 VDC power. When 115 VAC power is applied during flight, the power control relay 66 is activated which switches contact 67 to 115 VAC power and opens contacts 68 and 69. In this 115 VAC configuration the heater resistances 63, 64 and 65 are connected in series. Circuit breakers 610 and 611 are provided for safety.

A circuit of this complexity is not necessary in all preferred embodiments. For example, the heater element ground line could be routed through the thermostat and directly control current to the heater thereby eliminating the thermostat control relay 60. The number of zones provided depends on the design requirements of the particular intended application and may be as few as one or more than the three resistance zones 63, 64, and 65 illustrated in FIG. 9. Some applications may not require changing the connection of the resistance zones from parallel when 28 VDC is applied to series when 115 VAC is applied.

Figure 8:
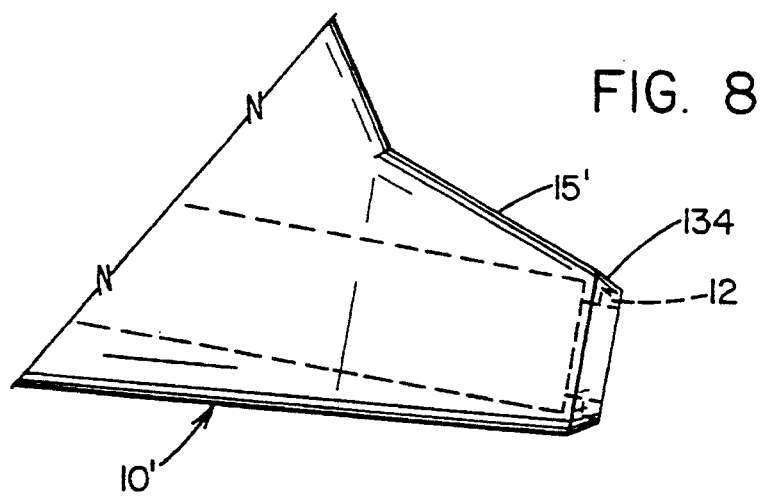
FIG. 8 is a fragmentary view of another embodiment of the fairing.

As illustrated in FIG. 8, in certain preferred embodiments, the exit tube 15' of fairing 10' is chamfered at the end where the outlet portion of the drain tube 17 exits the fairing 10'. This chamfer 134 directs the airflow over and around the exit tube 15' to prevent discharged waste water from collecting on the exit tube 15'.

A bottom discharge drainmast assembly 200 according to another embodiment of the invention is presented in FIG. 10. Drainmast 200 comprises fairing 202 and drain tube assembly 204. Fairing 202 has a mast 205 and a mounting base 203. Mounting base 203 is adapted for attaching the drainmast assembly to an aircraft, similar to mounting base 13 of FIG. 1. Fairing 202 defines a hollow cavity 228. In this embodiment, drain tube assembly 204 includes a drain tube 206 and a foot 208. The drain tube 206 and foot 208 have electrothermal heaters. A bottom discharge drainmast is suitable for many applications, but normally requires a heated foot since liquid discharged from the drain tube 206 tends to remain adhered to the bottom of the foot 208 and is blown back toward the trailing edge of the mast 205. An ice ball may form on foot 208 if it is not heated.

A resilient sealed interface 209 is disposed between the fairing mast 205 and the foot 208. This interface is an important feature of the invention. The drain tube 206 and foot 208 expand and contract as their temperatures rise and fall with power cycles to the electrical heaters and with changing atmospheric conditions. The resilient sealed interface 209 permits relative movement between the mast 205 and the drain tube assembly 204 while remaining sealed. Maintaining the seal is very important in order to prevent intrusion of various liquids into the cavity 228. Examples of such liquids include waste water discharged from the drainmast, hydraulic fluid from the aircraft, de-icing fluid, oils and other fluids from the aircraft, and fluids deposited inside the aircraft during maintenance. Without resilience, either the interface 209, or the fairing 205, or the drain tube 206 may crack due to the relative expansion and contraction between the fairing 205 and drain tube assembly 204.

Power lines 212 and 214 enter mounting base 203 through a sealed hole 218 and supply electrical power to the drain tube assembly heaters. A ground line 216 enters sealed hole 218 and attaches to the drain tube assembly in a manner that permits the drain tube assembly to be grounded to the aircraft structure, for example, by mechanical fastener or welding. A flexible adapter fitting is attached to the drain tube 206 and serves to adapt the drain tube 206 to the aircraft waste water system. A drain tube flange or bracket 220 is rigidly attached to the drain tube 206. A portion 222 of adapter fitting 210 lies between the drain tube flange 220 and mounting base 203. Portion 222 acts as a gasket and is compressed between the drain tube flange 220 and mounting base 203 when screws 224 are inserted through the mounting base and engage nuts 226. In such manner, the interior of the drainmast is sealed against unwanted liquid intrusion through the top of the drainmast. The seal may be enhanced by placing a liquid sealant between portion 222 and mounting base 203. Examples of suitable liquid sealants include polysulfide sealant, RTV (room temperature vulcanizing) silicone elastomer sealant, or polyurethane sealant. Particularly preferred sealants include a polysulfide sealant such as catalog number PR-1422 Class B Fuel Tank Sealant available from Products Research & Chemical Corporation, Glendale, California, or an RTV silicone elastomer sealant such as catalog number 738 available from Dow Corning Corporation, Midland, Mich. The entire drainmast is thus sealed except for breather hole 229 that vents cavity 228 to atmospheric pressure.

FIG. 11 presents a front view of drainmast 200 and demonstrates how the fairing 200 protrudes from the mounting base 203 which is attached to an aircraft structure. Adapter fitting 210 sealingly engages the outlet nipple 135 of the aircraft waste water system. A plurality of screws attach the drainmast to the aircraft through mounting holes 207.

FIG. 12 presents a cross section of the drainmast assembly along line 12—12 of FIG. 10. Mast 205 is airfoil shaped in order to facilitate flow of the surrounding airstream around the fairing. Drain tube assembly 204 extends through the cavity 228, preferably without contact with the walls of mast 205. Mast 205 may be formed from plastic or metal such as aluminum, but is most preferably formed from fiber reinforced plastic. The drain tube 206 is most preferably formed from metal, such as aluminum, copper, stainless steel, or titanium. However, drain tube 206 could also be formed from fiber reinforced plastic material. Electrothermal heater 230 comprises a metal element 232 imbedded in an electrical insulator bonded to the outside of the drain tube 206. The electrical insulator is preferably a silicone matrix such as catalog number FS-903 available from Permacel, a Nitto Denko Company, New Brunswick, N.J., as previously discussed in relation to FIGS. 6 and 7. The electrical insulator could also be a fiber reinforced plastic. If the drain tube is formed from fiber reinforced plastic, the metal element 232 could be imbedded directly in the drain tube. The metal element is preferably a heater wire that forms a predetermined distributed element pattern within the electrothermal heater 230. The heater wire composition is preferably 70% nickels and 30% iron, but could be chosen from other compositions commonly used for wire elements depending on the application. A layer of thermal insulation (not shown) could be disposed over the electrothermal heater 230 in order to conserve power, but is not necessary in all applications.

FIG. 13 presents a cross section detail of the interface between the fairing mast 205 and the foot 208. Mast 205 terminates in a lip 234 that runs around the circumference of the mast 205 where it mates to the foot 208. Foot 208 fits over the lip with the resilient sealed interface 209 located between lip 234 and foot 208. Resilient sealed interface 209 performs many of the same function as elastomeric seal 12 of FIG. 1. Resilient sealed interface 209 supports the foot 208 (and drain tube assembly 204) relative to mast 205, enables relative movement between the drain tube assembly 204 and the fairing 202 due to thermal expansion and contraction, seals the fairing 202 against entry of fluid exiting the tube, and facilitates removal and reinstallation of the drain tube assembly 204 for service or replacement. The interface 209 also serves to thermally isolate the foot 208 from the fairing mast 205.

Interface 209 is preferably formed from a hardened liquid sealant and offers additional advantages over elastomeric seal 12 of FIG. 1. First, interface 209 is bonded to both the foot 208 and the fairing mast 205 which provides a better seal. Second, a liquid sealant permits a greater degree of misalignment between the mast 205 and the foot 208 during the manufacturing process. As illustrated in FIG. 13, foot 208 could shift to the right toward line 236 or to the left toward line 238. The liquid sealant automatically compensates for misalignment by flowing into and out of the joint during the manufacturing process. The interface becomes serviceable when the liquid sealant cures (hardens). Examples of preferred liquid sealants include polysulfide sealant such as catalog number PR-1422 available from Products Research & Chemical Corporation and RTV silicone elastomer sealant such as catalog number 738 available from Dow Corning. Polysulfide sealant is preferred since silicone may render the finished drainmast difficult to paint. In contrast, elastomeric fitting 12 of FIG. 1 can only compensate for relatively limited misalignment and may not provide a sufficient seal if misalignment is too great. A hardened liquid sealant interface greatly facilitates the manufacturing process.

FIG. 14 presents the drain tube assembly 204. The drain tube assembly includes the drain tube 206, the drain tube flange 220 and the foot 208. The drain tube is preferably formed from metal and comprises three sections that are welded together along joints 254 and 256. The drain tube flange 220 may be similarly attached to the drain tube 258 by welding. Other fabrication techniques are possible depending on the tube materials, such as brazing or soldering. A portion of the drain tube 206 projects above the drain tube flange 220 for engagement with adapter fitting 210. The foot 208 is airfoil shaped similar to the mast 205 and comprises a base plate 242 and side 244. The foot is preferably formed from metal and may be formed by wrapping the side 244 around the base and welding the two together along the resulting seam. The foot could also be deep drawn and other manufacturing techniques may be possible. The foot 208 is subsequently mated to the drain tube 206 and the two are welded together along the resulting seam at the drain tube exit. Other fabrication techniques, such as brazing or soldering, may be suitable depending on the materials. Examples of suitable materials for the drain tube and foot include aluminum, stainless steel, copper, titanium, and their alloys.

Foot 208 also includes a foot heater 240. Foot heater 240 comprises a metal heater element 232 encapsulated in electrical insulation. The preferred electrical insulation is Permacell FS903 supported silicone. However, the electrical insulation could be formed from many materials commonly used for this purpose, one of which being fiber reinforced plastic. If foot 208 is formed from fiber reinforced plastic, the heater element 232 could be encapsulated in the foot. Foot heater 240 covers substantially all of the area of base plate 242 inside the foot. Foot heater 240 covers only a portion of the side 244 from the front of the drain tube exit at about line 252 back to the trailing edge of the foot. Heater 240 also terminates below top edge 260 in order to permit fairing lip 234 of FIG. 13 to fit inside the foot 208. The heater does not extend around the full circumference of side 244 since liquid exiting the drain tube is blown back toward the trailing edge of the foot during flight.

A thermostat 250 is bonded to the foot heater 240 and may be potted in with appropriate potting compound. Power lead 214 is electrically connected (wired) to the thermostat which controls power to the heater through electrical connection 246 to foot heater 240. Foot heater 240 is connected in series with drain tube heater 230 by electrical connection 248. The series circuit is completed by power lead 212. A ground line 216 is electrically connected to the drain tube assembly 204 through drain tube flange 220 by suitable means (screw, weld, solder joint, etc.). Power lines 214 and 212 and ground line 216 exit the drainmast through the mounting base as depicted in FIG. 10. Thermostat 250 is chosen with appropriate temperature set points to insure an appropriate operating temperature range for the drain tube assembly. In one preferred embodiment, the thermostat opens the circuit at about 200° F. and closes the circuit at about 170° F. These limits are application sensitive and may be determined through thermal analysis and empirical testing. As discussed previously, a heater element wire composition of 70% nickel and 30% iron can result in a self regulating heater. However, this is not possible in all applications and a thermostat may be required. A heater wire composition of 70% nickel and 30% iron is still desirable even if a thermostat is used since it tends to control thermal transients induced during power cycling to the heaters.

The heating elements may be manufactured as previously discussed in relation to drainmast 8 of FIG. 1. Two elements are required, one for the drain tube and one for the foot. The foot heating element and an appropriate adhesive is placed adjacent base 244 inside the foot 208 with the element side portions bent upward in contact with the side 244 of foot 208. Next, the drain tube heating element is wrapped around the circumference of the tube with an appropriate adhesive. The required electrical connections between the heaters are then completed. A plug is placed inside the foot such that the foot heating element is sandwiched between the plug and the foot. The plug is preferably formed from resilient material such as RTV silicone elastomer or chlorobutyl rubber. A particularly preferred RTV silicone elastomer for this purpose is Catalog number 3120 available from Dow Corning, Midland, Mich. Release film is applied over the assembly which is then vacuum bagged and cured under heat and pressure. After cure, the vacuum bag is removed and the thermostat 250 is bonded to the foot heater 240 and potted with RTV silicone elastomer such as Dow Corning 3120. The remaining electrical connections are then completed.

The fairing 202 may be formed from metal or plastic, but most preferably from fiber reinforced plastic. It may be formed in a single piece, or fabricated from more than one piece. Fairing 202 may be formed by compression molding, resin transfer molding, or filament winding. Fairing 202 is most economically formed by compression molding using three molds with a rigid or resilient plug to form the cavity 228. Two molds together form the mast 205 and the bottom of the mounting base 203 with parting lines along the leading and trailing edges of the mast. The mounting base is formed between the first two molds and the third mold with a parting line around the circumference of the mounting base. The molding compound is preferably a chopped fiberglass and/or graphite (carbon fiber) in a polyester or epoxy resin. Heat and pressure are applied which cures the fairing which is subsequently removed from the molds. The resilient plug is then removed from the cavity.

The drainmast is assembled by pulling leads 212, 214 and 216 through hole 218 in the mounting base 203 and inserting the drain tube assembly 204 with the adapter fitting 210 into the fairing. A sealant may be applied to hole 218 and between the adapter fitting 210 and the mounting base 203 thereby sealing the top of the drainmast. A liquid sealant bead is applied to the fairing lip 234 and the foot 208 is pressed into engagement with the fairing as depicted in FIG. 13. Screws 224 are inserted through holes in the base and engage nuts 226. The drain tube assembly is then drawn up and positioned by tightening screws 224. The drainmast assembly is thereby modular in the sense that it can be disassembled and repaired upon failure of any component. The drainmast can then be reassembled as described above.

Figure 15:
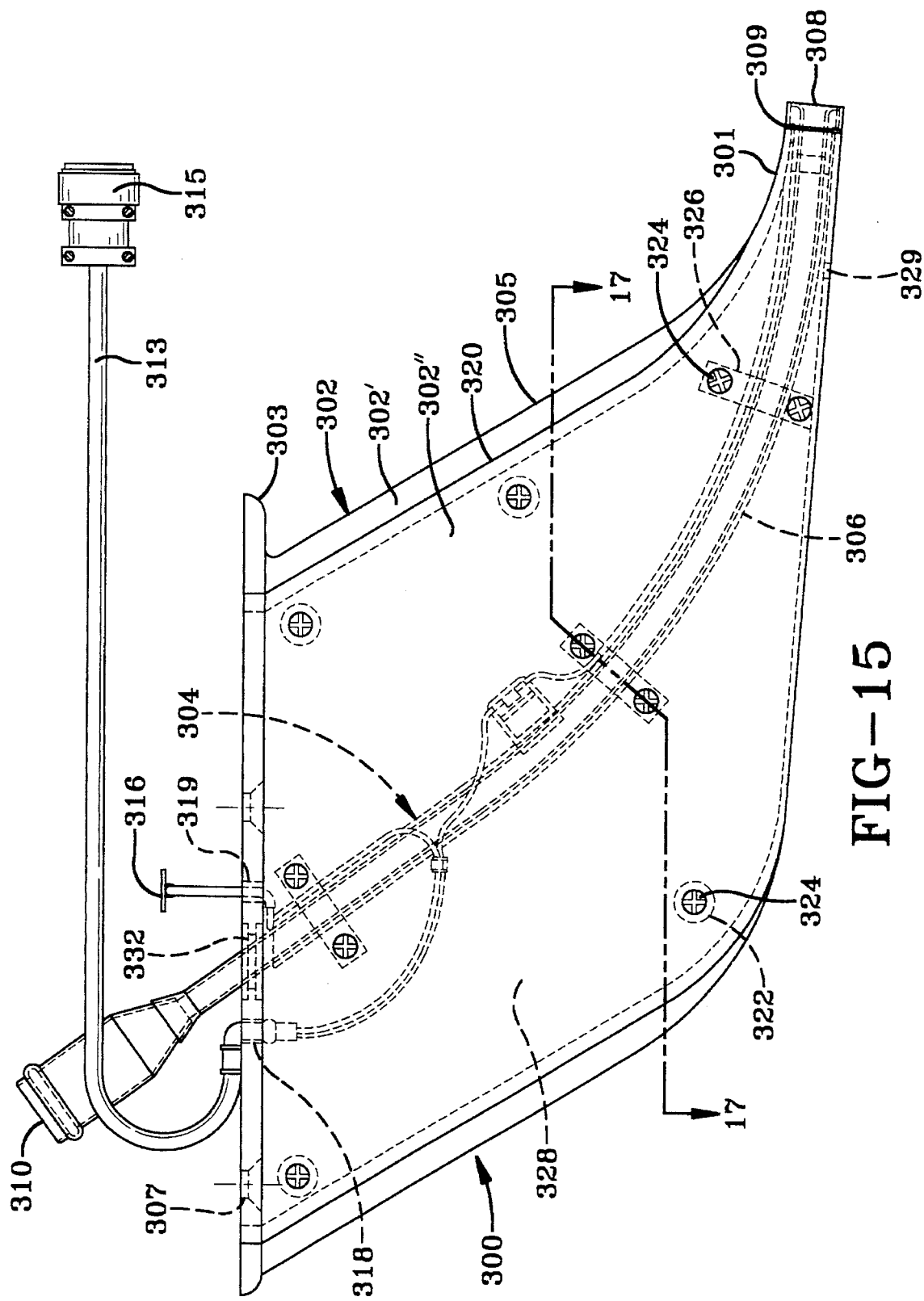
FIG. 15 is a side view of a drainmast assembly according to a third embodiment of the invention.

A rear discharge drainmast assembly 300 according to another embodiment of the invention is presented in FIG. 15. Drainmast 300 comprises fairing 302 and drain tube assembly 304. Fairing 302 includes a mounting base 303, a mast 305, and terminates in an exit tube 301. Mounting base 303 includes a plurality of mounting holes 307 for attaching the drain mast to an aircraft. In this embodiment, the fairing 302 is formed in two pieces: a fairing body 302' and a cover plate 302". The cover plate 302" separates from the fairing body 302' along parting line 320. The two pieces together define a hollow cavity 328 inside the fairing. They are joined together by screws 324 and mounting posts 322. Clamps 326 serve to join the two pieces and to clamp (attach) the drain tube assembly 304 to the fairing 302. This type of clamping arrangement is known in the prior art and will be discussed in more detail.

The drain tube assembly comprises a drain tube 306 and a foot 308 which include electrical heaters. The drain tube assembly 304 exits both ends of the fairing 302. An adapter fitting 310 serves to adapt the drain tube assembly 304 to the aircraft waste water system. In this embodiment, adapter fitting 310 is formed from metal and is rigidly attached to the drain tube 306. A first resilient sealed interface 309 is located between the foot 308 and the fairing 305. This interface serves the same purpose as described in relation to elastomeric fitting 12 of FIG. 1 and resilient sealed interface 209 of FIGS. 10 and 13. It permits relative thermal expansion and contraction between the drain tube assembly 304 and the fairing 302 while maintaining a seal and supporting the drain tube in the mast exit hole. At the opposite end., a second resilient sealed interface 332 is located between the fairing 302 and the drain tube assembly 304. Resilient sealed interface 332 supports the foot 308 (and drain tube assembly 304) relative to mounting base 303, enables relative movement between the drain tube assembly 304 and the fairing 302 due to thermal expansion and contraction, seals the fairing 302 against entry of fluid exiting the tube, and facilitates removal and reinstallation of the drain tube assembly 304 for service or replacement. In such manner, both ends of the drain tube assembly 304 are supported, but are free to "float" relative to the fairing while maintaining a seal against liquid penetration into the cavity 328.

A power line 313 enters the drain mast 300 through sealed hole 318 in mounting base 303 and terminates in connector 315 outside the fairing 302. Connector 315 mates to the aircraft electrical and control system. A ground line 316 is electrically connected to the drain tube assembly 304 and exits the fairing through sealed hole 319. The drainmast assembly 300 is thus sealed against liquid entry through the top of the mounting base 303 into cavity 328.

FIG. 16 presents a view of the top of the drainmast. Mast 305 extends below mounting base 303. Cover plate 302" joins to fairing body 302' along parting line 320. In the embodiment presented, second resilient sealed interface 332 comprises an elastomeric fitting. The fitting is captive between cover plate 302" and fairing body 302'. The elastomeric fitting includes an annulus with enlarged diameters on either end as shown in FIGS. 15 and 20. The mounting base 303 has mating surfaces that trap the fitting in place when the cover plate 302" is joined to the fairing body 302'.

FIG. 17 presents a cross sectional view of one of the clamps. Cover plate 302" joins fairing body 302' along parting line 320 forming cavity 328. An electrical heater 330 is wrapped around the circumference of drain tube 305. The construction of the electrical heater is similar to that described in FIG. 7. A metal element, preferably wire, is imbedded in an electrical insulation layer, preferably silicone elastomer. An outer insulation layer (layer 53 of FIG. 7) is optional. A resilient layer 334 may be formed around the drain tube assembly 304 at the clamp locations. The resilient layer 334 serves to locate and resiliently support the drain tube assembly 304 when clamped between the cover plate 302" and fairing body 302'. Resilient layer 334 is most preferably formed by wrapping silicone elastomer tape around the drain tube assembly at the clamp locations. A preferred silicone elastomer tape is catalog number 2650 available from Permacell, a Nitto Denko Company, New Brunswick, N.J. The clamp 326 is split along parting line 336 with half being integrally formed with the cover plate 302" and half being integrally formed with the fairing body 302'. Screws 324 draw cover plate 302" down thereby establishing the clamp action. Such clamping arrangements are known in the art and may be varied without effecting the practice of the invention as long as the drain tube assembly 304 is permitted to float relative the fairing 302.

FIG. 18 presents a rear view of the drainmast 300 attached to and extending beneath the aircraft structure. Mast 305 protrudes from mounting base 303 into a surrounding airflow. Adapter fitting 310 attaches to a flexible hose (not shown) that is part of the aircraft waste water system. Ground line 316 is electrically connected to the aircraft structure.

FIG. 19 presents a detailed cross section of the drainmast 300 where the drain tube assembly 304 exits the fairing mast 305 along line 19—19 of FIG. 16. Drain tube 306 terminates with a foot flange 342. Foot ring 344 extends circumferentially around foot flange 342. In one preferred embodiment, the drain tube 305 is formed from stainless steel and the foot ring 344 is formed from copper. The two are welded together along the seam where they meet each other. Other metals may be used to form the drain tube 306 and foot ring 344 which may permit other fabrication techniques such as brazing or soldering or integral formation by spinning or deep drawing. They might also be formed from fiber reinforced plastic in which case the foot ring 344 could be integrally molded with drain tube 306. A foot heater 340 is circumferentially located inside the foot between the drain tube 305 and foot ring 344. Foot heater 340 includes a foot heating element 341 encapsulated in electrical insulation, preferably silicone elastomer. For ease of manufacture, the drain tube heater 330 is separately formed and includes a drain tube element 333 encapsulated in electrical insulation, preferably silicone elastomer. The drain tube heater 330 and foot heater 340 circumferentially abut at 360. A lip 346 extends from end of the exit tube 301 similar to lip 234 of FIG. 13. The first resilient sealed interface 309 is located between lip 346 and foot ring 344. As discussed in relation to FIG. 13, a hardened liquid sealant is preferred for interface 309 which permits relatively larger misalignment between foot 308 and mast 305 during manufacturing. In particular, foot ring 344 may shift laterally out of alignment with mast 305 while maintaining the required seal. This feature greatly facilitates the manufacturing process.

FIG. 20 presents drain tube assembly 304. Drain tube heater 330 is wrapped around the circumference of the drain tube 306 along the length of the tube. Foot heater 340 is similarly wrapped around the drain tube 306 and inserted into the foot 308 as discussed above in relation to FIG. 19. Drain tube heater 330 and foot heater 340 circumferentially abut at interface 360. The power and control line 313 is shown severed for the sake of clarity. Drain tube heater 332 and foot heater 340 are electrically connected in series, described as follows. Power line 314 is electrically connected to thermostat 350. Line 352 electrically connects the thermostat to the foot heater 340 at 354. The return line (not shown) from the foot heater 340 is electrically connected to the drain tube heater 332 at 354. Power line 312 is electrically connected to the drain tube heater 332 and completes the series circuit. As before, the preferred heater element material for the drain tube heater 332 and foot heater 340 is heater wire having a composition of 70% nickel and 30% iron. A fully self regulating heater may not be possible for all applications, and a thermostat may be required. In such a case, the wire specified above helps to control thermal transients and creates at least a partially self regulating drain tube heater 332 and foot heater 340. In a certain preferred embodiment, the thermostat is set to open the heater circuit at about 153° F. and to close the heater circuit at about 133° F. A ground line 316 (shown severed for ease of illustration) is electrically connected to a ground bracket 317 by suitable means. Ground bracket 317 is attached to drain tube 306 by suitable means, such as welding, brazing, or soldering.

Drain tube assembly 304 is fabricated using procedures similar to those described in relation to drain tube assemblies 11 (FIG. 2) and 204 (FIG. 14). A liquid sealant may be provided between elastomeric fitting 332 (the second resilient sealed interface) and the drain tube 306. In some applications, it may be desirable to use a liquid sealant, such as PR-1422 polysulfide sealant or Dow Corning 738 RTV silicone elastomer, to form the second resilient sealed interface 332. Referring to FIG. 15, the fairing 302 may be formed from metal or plastic, but fiber reinforced plastic is particularly preferred. Fairing 302 may be formed by compression molding, resin transfer molding, or other suitable molding techniques. In a certain preferred embodiment, the cover plate 302" and fairing body 302' are separately compression molded using a chopped fiberglass and/or graphite fiber in polyester or epoxy resin molding compound. The drainmast assembly 300 is fabricated by applying a liquid sealant bead, preferably a polysulfide, around the fairing lip 346 (FIG. 19) and around the circumference of elastomeric fitting 332 between the two enlarged outside diameters. The drain tube assembly 304 is then placed in the half of clamp 326 (FIG. 17) located in the fairing body 302'. A bead of polysulfide sealant is then applied around the circumference of fairing parting line 320 and to all screw locations. The cover plate 302" is then placed over the fairing body 302' and drawn down by tightening screws 324. The fairing is thereby completely sealed, except for a breather hole 329 that vents cavity 328 to the atmosphere.

A schematic circuit for drainmasts 200 and 300 is presented in FIG. 21. The equivalent components for drainmast 300 are in parentheses next to the corresponding drainmast 200 components. Electrical power at 115 VAC is supplied to power line 214 (314) and transferred to thermostat 250 (350). Thermostat 250 (350) controls the power to foot heater 240 (340) and drain tube heater 230 (330) which are grounded to the aircraft electrical system via power line 212 (312). Drainmast 200 (300) is grounded to the aircraft via ground line 216 (316).

Although the invention has been described with reference to certain preferred embodiments, including the best embodiments, it would be apparent to people skilled in the art of aircraft drainmasts that other variations are possible which are possible thereover. These variations are intended to be included by the present specification and appended claims.

I claim:

1. A drainmast for discharging fluid into a surrounding airflow, comprising:

a fairing having first and second opposing ends;

a drain tube disposed within said fairing and exiting said fairing at said first and second ends, said drain tube including an electrothermal heating element;

a drain tube attachment that attaches said drain tube to said fairing; and, a first resilient sealed interface between said drain tube and said first end.

2. The drainmast of claim 1 wherein said drain tube attachment attaches said drain tube to said second end.

3. The drainmast of claim 1 wherein said first resilient sealed interface is a hardened liquid sealant.

4. The drainmast of claim 3 wherein said hardened liquid sealant is chosen from the group consisting of polysulfide sealant and room temperature vulcanizing silicone elastomer sealant.

5. The drainmast of claim 1 wherein said first resilient sealed interface is an elastomeric fitting.

6. The drainmast of claim 1 wherein said drainmast is adapted to discharge fluid about parallel to the surrounding airflow.

7. The drainmast of claim 1 wherein said drainmast is adapted to discharge fluid about perpendicular to the surrounding airflow.

8. The drainmast of claim 1 further comprising a second resilient sealed interface between said drain tube and said second end.

9. The drainmast of claim 8 wherein said second resilient sealed interface is a hardened liquid sealant.

10. The drainmast of claim 9 wherein said hardened liquid sealant is chosen from the group consisting of polysulfide sealant and room temperature vulcanizing silicone elastomer sealant.

11. The drainmast of claim 8 wherein said second resilient sealed interface is an elastomeric fitting.

12. The drainmast of claim 1 wherein said drain tube attachment resiliently attaches said drain tube to said fairing.

13. The drainmast of claim 1 wherein said first resilient sealed interface resiliently fixes said drain tube to said first end.

14. The drainmast of claim 1 wherein said fairing second end is adapted to be attached to an aircraft.

15. The drainmast of claim 14 further comprising a second resilient sealed interface between said drain tube and said second end.

16. The drainmast of claim 14 wherein said drain tube includes a foot exposed to the surrounding airflow, said foot including an electrothermal heating element, said first resilient sealed interface being between said foot and said first end.

17. The drainmast of claim 16 wherein said drainmast is adapted to discharge fluid about parallel to the surrounding airflow.

18. The drainmast of claim 17 wherein said drainmast is adapted to discharge fluid about perpendicular to the surrounding airflow.

19. The drainmast of claim 16 wherein said first resilient sealed interface is a hardened liquid sealant.

20. The drainmast of claim 16 wherein said drain tube attachment attaches said drain tube to said second end.

21. The drainmast of claim 20 further comprising a second resilient sealed interface between said drain tube and said second end.

22. The drainmast of claim 21 wherein said fairing is a fiber reinforced plastic fairing.

23. The drainmast of claim 16 wherein said drain tube attachment resiliently attaches said drain tube to said fairing between said first and second ends.

24. The drainmast of claim 23 further comprising a second resilient sealed interface between said drain tube and said second end.

25. The drainmast of claim 24 wherein said drain tube attachment includes a clamp means for clamping the drain tube to the fairing.

26. The drainmast of claim 25 wherein said drain tube includes a foot outside the first end, said foot including an electrothermal heating element, said first resilient sealed interface being between said foot and said first end.

27. The drainmast of claim 26 wherein said fairing is a fiber reinforced plastic fairing.

28. The drain tube apparatus of claim 1 further comprising a foot that extends outside the fairing, said foot including an electrothermal heating element.

29. A method of assembling a drainmast comprising the steps of:

providing a fairing having first and second ends;

disposing a drain tube including an electrothermal heating element within said fairing with said drain tube exiting said first and second ends; and, attaching said drain tube to said fairing;

forming a resilient and sealed interface between said drain tube and said first end 30. The method of claim 29 further comprising the step of forming a resilient and sealed interface between said drain tube and said second end.

31. The method of claim 29 wherein the step of attaching said drain tube to said fairing includes the step of attaching said drain tube to said second end.

32. The method of claim 31 wherein the step of attaching said drain tube to said fairing includes the step of clamping said drain tube to said fairing.

33. The method of claim 29 wherein the step of attaching said drain tube to said fairing includes the step of attaching said drain tube to said fairing in between said first and second ends.

34. The method of claim 29 wherein the step of forming a resilient and sealed interface between said drain tube and said first end includes the step of locating an elastomeric fitting between said drain tube and said first end.

35. The method of claim 29 wherein the step of forming a resilient and sealed interface between said drain tube and said first end includes the step of locating a liquid sealant between said drain tube and said first end, and the step of hardening said liquid sealant.

36. The method of claim 29 wherein the drain tube includes a foot having an electrothermal heating element; and, the step of forming a resilient and sealed interface between said drain tube and said first end includes the step of locating a liquid sealant between said foot and said first end, and the step of hardening said liquid sealant.

* * * * *